Oct. 10, 1950 — E. H. BERGE — 2,525,014
FLOAT VALVE
Filed Nov. 1, 1946
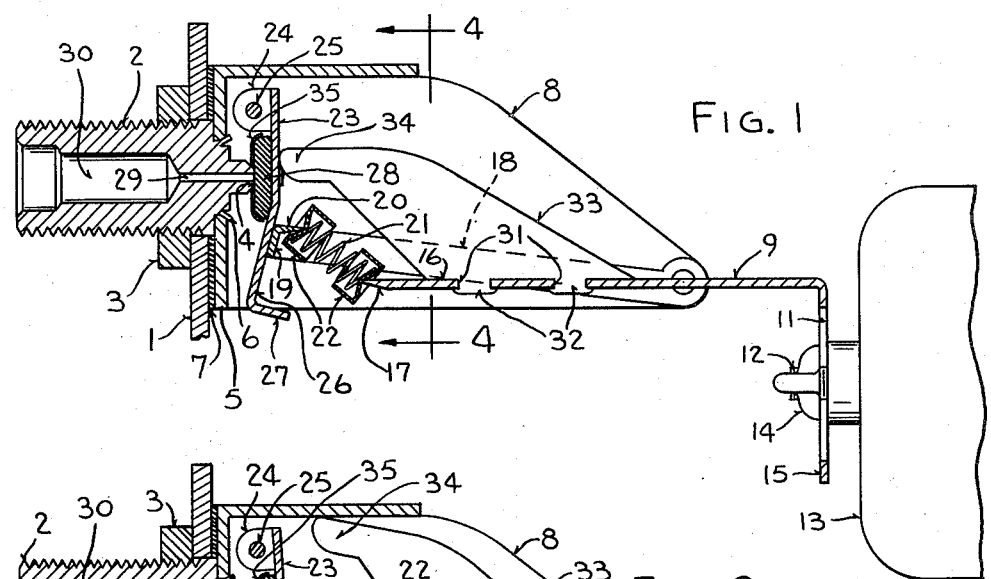
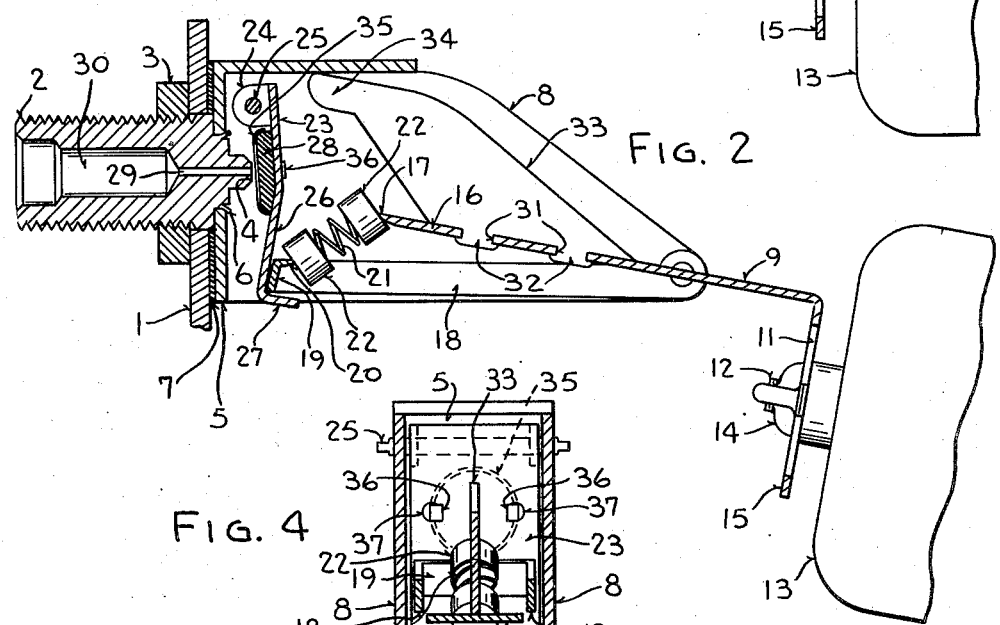
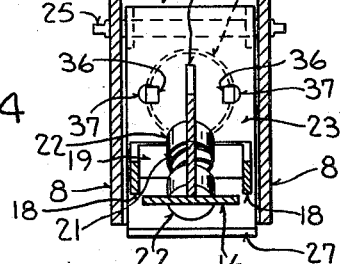
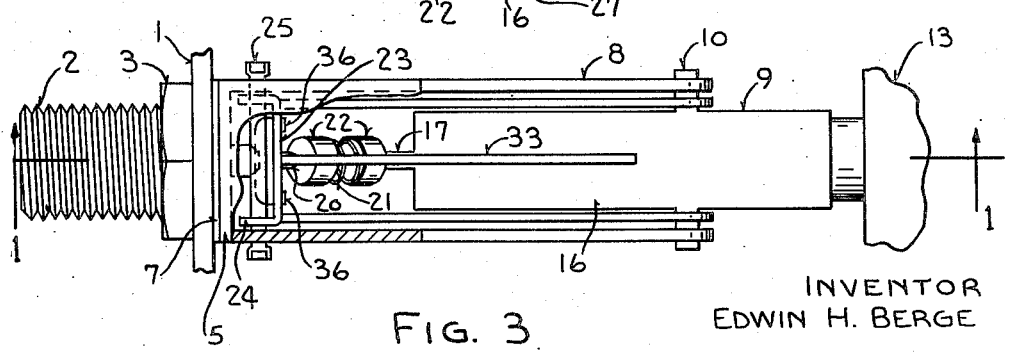
INVENTOR
EDWIN H. BERGE Patented Oct. 10, 1950

2,525,014

UNITED STATES PATENT OFFICE 2,525,014

FLOAT VALVE

Edwin H. Berge, Milwaukee, Wis.

Application November 1, 1946, Serial No. 707,309

4 Claims. (Cl. 137—104)

This invention relates to a float valve, and is an improvement over that disclosed in the United States patent to Breckheimer, Number 2,309,043 of January 19, 1943, for Float Valve and Humidifier Construction.

This invention has the same general objects as that disclosed in the above entitled patent and is designed to provide a quick acting float valve which will snap open and snap closed, and which is so made that it is locked in closed position and held closed through the action of the float.

Further objects are to provide a novel form of float valve in which a main float lever is pivotally supported intermediate its ends and in which a yoke member is pivoted on the same pivotal means for supporting the float lever, and in which a compression spring is positioned between the yoke member and the pivoted float lever, the yoke coacting with a pivoted valve lever for opening and closing the valve and for locking the valve closed.

An embodiment of the invention is shown in the accompanying drawings, in which:

Figure 1 is a sectional view showing the float valve in closed position, such figure corresponding to a section on the line 1—1 of Figure 3.

Figure 2 is a corresponding view showing the float valve in open position.

Figure 3 is a plan view partly broken away of the structure shown in Figure 1.

Figure 4 is a transverse sectional view on the line 4—4 of Figure 1.

Referring to the drawings, it will be seen that the float valve has been shown as supported from the wall 1 of a water pan or other similar member. A fitting 2 is passed through an aperture in the wall 1 and is locked in place by means of a nut 3. This fitting is adapted to be connected to a water supply pipe and is provided at its outer end with a valve seat 4. The fitting 2 has a cylindrical portion passing through an aperture in the transverse portion of a frame member 5 and swaged thereto as indicated at 6. A gasket 7 is positioned between the transverse portion 5 of the frame member and the wall 1 to secure a water tight joint.

The frame member is provided with a pair of outwardly extending spaced arms 8 between which is pivoted a float lever 9. The float lever 9 is preferably a plate-like member provided with integral trunnions 10 which are pivoted in the outer ends of the arms 8 as shown most clearly in Figure 3. The outer end of the float lever 9 is provided with a slot 11 through which the threaded stem 12 of a float 13 projects. A thumb nut 14 is screwed on the stem 12 and is adapted to lock the float in any desired adjusted position with reference to the right angle extension 15 of the float lever 9.

The float lever 9 is provided with an inwardly extending projection or extension 16 which has a beveled tongue 17 projecting therefrom.

A yoke member 18 is pivoted on the trunnions 10 of the float lever 9, as shown in Figure 3, and is provided with a transverse portion 19. This transverse portion 19 is provided with a projecting beveled tongue 20. Between the tongues 17 and 20 a compression spring 21 is positioned. The ends of the compression spring 21 are carried within cup-shaped cap members 22 having depressed conical portions for receiving the tongues 17 and 20, as shown in Figure 1.

A valve lever 23 is provided with a pair of ears 24 which are located within the side frames 8 of the frame member and are pivoted on a transverse pin 25 carried by the frame member. This valve lever is provided with a slanting or cam-like portion 26 and with an angularly bent stop portion 27, which latter is adapted to arrest the downward rocking motion of the yoke member 18. The slanting portion 26 or cam portion of the valve lever 23 coacts with the transverse portion 19 of the yoke member so that when the yoke member is rocked to its uppermost position, as shown in Figure 1, it wedges against the cam portion 26 of the valve lever and locks the valve lever in closed position.

The valve lever carries valve means or gasket means 28 which is preferably of suitable yielding material and which is arranged to coact with the projecting valve seat 4, as shown in Figure 1, it being noted that the fitting 2 is provided with a small orifice 29 communicating with its main passageway 30.

The valve lever 9 is provided with a pair of openings 31 through which feet 32 of a wedging arm or locking member 33 extend. The feet 32 are swaged over, as shown in Figure 1, to lock the arm 33 to the valve lever 9. The arm 33 is provided with an extension 34 having a rounded end adapted to wedge against the valve lever 23 when the float is in its uppermost position to thus hold the valve lever in closed position, even though the compression spring 21 might inadvertently break in the course of time.

A very convenient way of holding the valve means 28 against the valve lever 23 is by means of an open cup-like retainer or holding means 35 which fits over and around the edges of the valve means 28, and which is open in its central portion. This holding cup-like member 35 is provided with cleats or feet 36 which extend through openings 37 in the valve lever 23 and which are clinched in place, as shown in Figure 4. This provides a very simple means and a very secure means of holding the valve member 28 in place.

The operation of the apparatus is as follows:

Assuming the parts are in position shown in Figure 1 and that the float sinks to the position shown in Figure 2, it will be seen that the compression spring 21 has been carried across dead center with reference to the yoke member 18 and consequently the yoke member snaps downwardly to the position shown in Figure 2. This allows the valve lever 23 to rock to open position under the influence of the water pressure and allows the water to flow until the float rises. When the float rises, the outer end of the compression spring 21 is again carried across dead center with reference to the yoke 18 but in the reverse direction and consequently the yoke member 18 snaps upwardly to the position shown in Figure 1, thus closing the valve due to the cam or wedging action between the transverse portion 19 of the yoke member and the slanting or cam face 26 of the valve lever 23. At the same time the extension 34 of the arm 33 of the float lever 9 wedges against the valve lever 23 and locks the valve lever closed, in addition to the wedging action of the yoke member 18. This feature, namely the engagement of the extension 34 with the valve lever and its wedging action, insures the closing of the valve, although the spring 21 might have broken under very extended service.

It will be seen that the major number of parts constituting this float lever may be formed of simple stampings and are easily and cheaply produced.

It will be seen also that a very simple pivot means has been provided for both the float lever and for the yoke member. Further than this, the construction generally is of extreme simplicity and may be cheaply produced.

Although this invention has been described in considerable detail, it is to be understood that such description is intended as illustrative rather than limiting, as the invention may be variously embodied and is to be interpreted as claimed.

I claim:

1. A float valve comprising a valve seat, a pivoted valve lever having a wedging portion and having a valve adapted to seat on said valve seat, quick acting mechanism including a yoke member having a transverse portion provided with a wedging portion in sliding engagement with the wedging portion of said valve lever and pivoted to rock about an axis at a point spaced from the pivot point of said valve lever, said transverse portion having wedging engagement with said valve lever for moving said valve lever to valve closed position, the transverse portion of said pivoted yoke being arranged to move into a locking position against said valve lever to lock said valve lever in closed position when said yoke is in one position, float means movable between an upper and a lower position, and a compression spring bearing at one end on the transverse portion of said yoke member, the other end of said spring being moved by said float means back and forth across dead center with reference to said pivoted yoke as said float means rises and falls.

2. A float valve comprising a valve seat, a pivoted valve lever having a wedging portion and having a valve adapted to seat on said valve seat, quick acting mechanism including a yoke member having a transverse portion provided with a wedging portion in sliding engagement with the wedging portion of said valve lever and pivoted to rock about an axis at a point spaced from the pivot point of said valve lever, said transverse portion having wedging engagement with said valve lever for moving said valve lever to valve closed position, the transverse portion of said pivoted yoke being arranged to move into a locking position against said valve lever to lock said valve lever in closed position when said yoke is in one position, pivoted float means pivoted about the same axis as said yoke member and having an extension projecting towards said valve lever, and a compression spring bearing at one end against the extension of said pivoted float means and at the other end against the transverse portion of said yoke member.

3. A float valve comprising a valve seat, a pivoted valve lever having a wedging portion and having a valve adapted to seat on said valve seat, quick acting mechanism including a yoke member having a transverse portion provided with a wedging portion in sliding engagement with the wedging portion of said valve lever and pivoted to rock about an axis at a point spaced from the pivot point of said valve lever, said transverse portion having wedging engagement with said valve lever for moving said valve lever to valve closed position, the transverse portion of said pivoted yoke being arranged to move into a locking position against said valve lever to lock said valve lever in closed position when said yoke is in one position, pivoted float means pivoted at the same axis as said yoke member and having an extension projecting towards said valve lever and having a projecting arm adapted to wedge against said valve lever when said float means is in one position, and a compression spring bearing at one end on the transverse portion of said yoke member, the other end of said spring bearing against the extension of said pivoted float means and being movable by said pivoted float means back and forth across dead center with reference to said pivoted yoke as said float means rocks.

4. A float valve comprising a valve seat, a pivoted valve lever having a wedging portion and having a valve adapted to seat on said valve seat, quick acting mechanism including a pivoted yoke having a transverse portion provided with a wedging portion located adjacent said valve lever, the wedging portion of said transverse portion of said pivoted yoke being arranged to move into locking and wedging engagement with said valve lever to thereby wedge against said valve lever to lock said valve lever in closed position when said yoke is in one position, a pivoted float lever having trunnions, frame means pivotally supporting said trunnions, said pivoted yoke member being pivoted on said trunnions, said float lever having a float at one end and an extension at the other end, and a compression spring bearing at one end on the transverse portion of said pivoted yoke member and bearing at the other end against the extension of said float lever.

EDWIN H. BERGE.

REFERENCES CITED

The following references are of record in the file of this patent:

UNITED STATES PATENTS

| Number | Name | Date |
| --- | --- | --- |
| 622,114 | Burdett | Mar. 28, 1899 |
| 1,549,566 | Bain | Aug. 11, 1925 |
| 2,309,043 | Breckheimer | Jan. 19, 1943 |